US012030316B2

(12) United States Patent
Nagano et al.

(10) Patent No.: US 12,030,316 B2
(45) Date of Patent: Jul. 9, 2024

(54) CLEANING LIQUID, SET, INK-JET RECORDING APPARATUS AND CLEANING METHOD

(71) Applicant: Brother Kogyo Kabushiki Kaisha, Nagoya (JP)

(72) Inventors: Taro Nagano, Nagoya (JP); Hirofumi Kuriki, Nagoya (JP); Shunichi Higashiyama, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 282 days.

(21) Appl. No.: 17/538,319

(22) Filed: Nov. 30, 2021

(65) Prior Publication Data

US 2022/0111654 A1 Apr. 14, 2022

Related U.S. Application Data

(63) Continuation of application No. PCT/JP2020/013083, filed on Mar. 24, 2020.

(30) Foreign Application Priority Data

May 31, 2019 (JP) ................................ 2019-102155

(51) Int. Cl.
*B41J 2/165* (2006.01)
*C11D 1/825* (2006.01)
(Continued)

(52) U.S. Cl.
CPC ....... *B41J 2/16552* (2013.01); *B41J 2/16535* (2013.01); *C11D 1/825* (2013.01);
(Continued)

(58) Field of Classification Search
CPC ................ B41J 2/16552; B41J 2/16535; B41J 2002/16558; C11D 1/825; C11D 3/2044; C11D 3/2068; C11D 3/43; C11D 11/0041
See application file for complete search history.

(56) References Cited

U.S. PATENT DOCUMENTS 5,609,671 A 3/1997 Nagasawa
10,293,600 B2 5/2019 Kanke
(Continued)

FOREIGN PATENT DOCUMENTS

CN 103725083 A 4/2014
CN 107443909 A * 12/2017 .......... B41J 2/16505
(Continued)

OTHER PUBLICATIONS

Feb. 7, 2023—(JP) Notice of Reasons for Refusal—App 2019-102155, Eng Tran.
(Continued)

*Primary Examiner* — Sharon Polk
(74) *Attorney, Agent, or Firm* — Banner & Witcoff, Ltd.

(57) ABSTRACT

A cleaning liquid, usable for cleaning of an ink-jet recording apparatus, includes: a nonionic surfactant, solubility of the nonionic surfactant in water at 20° C. being less than 0.2% by mass; a first water-soluble organic solvent of which solubility parameter is not less than 13; a second water-soluble organic solvent of which solubility parameter is less than 12; and water. The cleaning liquid satisfies the following conditions (1) to (4):

$X \geq 0.1$; Condition (1):

$A - B \geq 0$; Condition (2):

$B/X \geq 15$; Condition (3):

$10 \leq A + B \leq 60$. Condition (4):

(Continued)

X: a content amount (% by mass) of the nonionic surfactant, A: a content amount (% by mass) of the first water-soluble organic solvent, and B: a content amount (% by mass) of the second water-soluble organic solvent.

10 Claims, 1 Drawing Sheet

(51) Int. Cl.
*C11D 3/20* (2006.01)
*C11D 3/43* (2006.01)
(52) U.S. Cl.
CPC .......... *C11D 3/2044* (2013.01); *C11D 3/2068* (2013.01); *C11D 3/43* (2013.01); *B41J 2002/16558* (2013.01); *C11D 2111/20* (2024.01)

(56) References Cited

U.S. PATENT DOCUMENTS

| | | | |
|---|---|---|---|
| 2005/0018023 A1 | 1/2005 | Momose et al. | |
| 2006/0079437 A1 | 4/2006 | Kondo et al. | |
| 2007/0100024 A1 | 5/2007 | Gu et al. | |
| 2009/0229489 A1 | 9/2009 | Gu | |
| 2010/0076150 A1 | 3/2010 | Ikoshi | |
| 2013/0278671 A1 | 10/2013 | Ishihara et al. | |
| 2014/0107007 A1 | 4/2014 | Sao et al. | |
| 2018/0170061 A1 | 6/2018 | Nakamura et al. | |
| 2019/0329553 A1 | 10/2019 | Suzuki et al. | |
| 2020/0164651 A1 * | 5/2020 | Takaori | C09D 11/02 |

FOREIGN PATENT DOCUMENTS

| | | | | | |
|---|---|---|---|---|---|
| CN | 109641465 | A | | 4/2019 | |
| CN | 108340676 | B | * | 5/2020 | B41J 2/01 |
| EP | 3564348 | A1 | | 11/2019 | |
| JP | S58-071170 | A | | 4/1983 | |
| JP | S62-169876 | A | | 7/1987 | |
| JP | S62-169877 | A | | 7/1987 | |
| JP | H01-148557 | A | | 6/1989 | |
| JP | H08-3498 | A | | 1/1996 | |
| JP | 2000-513396 | A | | 10/2000 | |
| JP | 2002-514258 | A | | 5/2002 | |
| JP | 2006-089559 | A | | 4/2006 | |
| JP | 2008-524400 | A | | 7/2008 | |
| JP | 2008302577 | A | * | 12/2008 | B41J 11/002 |
| JP | 2009-515007 | A | | 4/2009 | |
| JP | 2011-515535 | A | | 5/2011 | |
| JP | 2012-021108 | A | | 2/2012 | |
| JP | 2013-241552 | A | | 12/2013 | |
| JP | 2018-095841 | A | | 6/2018 | |
| JP | 2018-127580 | A | | 8/2018 | |
| TW | 201631066 | A | | 9/2016 | |
| WO | 97/48769 | A1 | | 12/1997 | |
| WO | 98/54277 | A1 | | 12/1998 | |
| WO | 2006/066132 | A2 | | 6/2006 | |
| WO | 2007/053564 | A2 | | 5/2007 | |
| WO | 2009/117071 | A1 | | 9/2009 | |
| WO | 2018/124120 | A1 | | 7/2018 | |
| WO | 2018/124124 | A1 | | 7/2018 | |

OTHER PUBLICATIONS

Aug. 19, 2020—International Search Report—Intl App PCT/JP2020/013083.
Aug. 19, 2020—(WO) Written Opinion of ISA—Intl App PCT/JP2020/013083.
Apr. 28, 2023—(CN) The First Office Action—CN App 202080039621.4, Eng Tran.
Oct. 11, 2023—(EP) Examination Report—EP App. 20719766.6.
Oct. 31, 2023—(CN) The Second Office Action—CN App 202080039621.4, Eng Tran.
Hu, Xin-xin, et al., Development of new ink cleaning agent and its application research, Contemporary Chemical Industry, May 2011, vol. 40, No. 5, p. 454-456.

* cited by examiner

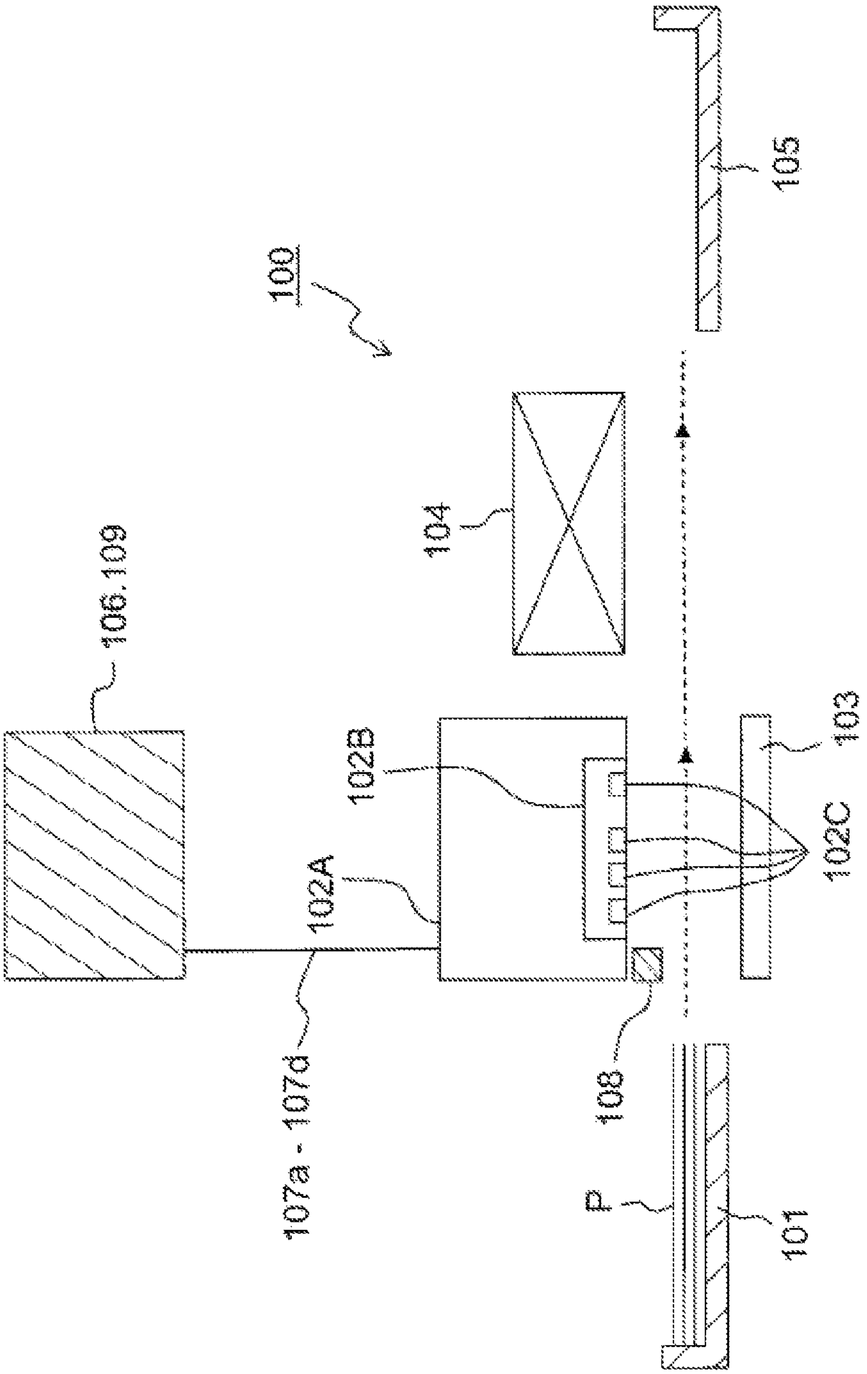
100
105
104
106.109
102B
103
102C
102A
107a - 107d
108
P
101

CLEANING LIQUID, SET, INK-JET RECORDING APPARATUS AND CLEANING METHOD

CROSS REFERENCE TO RELATED APPLICATIONS

This application is a Continuation application of International Application No. PCT/JP2020/013083 which was filed on Mar. 24, 2020 claiming the conventional priority of Japanese patent Application No. 2019-102155 filed on May 31, 2019. The disclosures of Japanese patent Application No. 2019-102155 and International Application No. PCT/JP2020/013083 are incorporated herein by reference in their entirety.

BACKGROUND

The present disclosure relates to a cleaning liquid (cleaning fluid, cleaning solution), a set, an ink-jet recording apparatus and a cleaning method.

A variety of kinds of cleaning liquid are proposed as a cleaning liquid for a discharge nozzle (jetting nozzle) and an ink channel of an ink-jet recording apparatus. For example, it is proposed that a liquid obtained by removing a dye from a dye ink is made to be a cleaning liquid. Further, it is proposed a maintenance liquid containing polyvalent alcohols, monovalent alcohols and water; it is proposed a maintenance liquid containing a lower alcohol, an anionic surfactant and water; and it is proposed a maintenance liquid containing a water-soluble chelating agent and water.

SUMMARY

On the other hand, there is a demand for a water-based ink for ink-jet recording which has a satisfactory wetting property with respect to a recording medium having a low water-absorbing property or having a non-water absorbing property (hereinafter referred to as "hydrophobic" recording medium, in some cases), such as coated paper, film, etc. In order to provide such a water-based ink, it is conceivable to add a wetting agent in the water-based ink. However, in a case that maintenance (cleaning of a discharge nozzle, a wiper wiping the discharge nozzle, an ink channel, etc.) is performed in an ink-jet recording apparatus using the water-based ink added with the wetting agent, the wetting agent in the water-based ink undergoes a phase separation, which in turn causes any blocking (stoppage, closing) of the channel and/or clogging of the nozzle, in some cases.

In view of the above situation, an object of the present disclosure is to provide a cleaning liquid capable of suppressing any closing of channel and clogging of nozzle during the maintenance of an ink-jet recording apparatus using a water-based ink having a satisfactory wetting property with respect to a hydrophobic recording medium.

According to a first aspect of the present disclosure, there is provided a cleaning liquid usable for cleaning of an ink-jet recording apparatus, the cleaning liquid including:

- a nonionic surfactant, solubility of the nonionic surfactant in water at 20° C. being less than 0.2% by mass;
- a first water-soluble organic solvent of which solubility parameter is not less than 13;
- a second water-soluble organic solvent of which solubility parameter is less than 12; and water.

The cleaning liquid satisfies the following conditions (1) to (4):

$$X \geq 0.1 \qquad \text{Condition (1):}$$

$$A-B \geq 0 \qquad \text{Condition (2):}$$

$$B/X \geq 15 \qquad \text{Condition (3):}$$

$$10 \leq A+B \leq 60 \qquad \text{Condition (4):}$$

in the conditions (1) to (4),

- X: a content amount (% by mass) of the nonionic surfactant in an entire amount of the cleaning liquid,
- A: a content amount (% by mass) of the first water-soluble organic solvent in the entire amount of the cleaning liquid, and
- B: a content amount (% by mass) of the second water-soluble organic solvent in the entire amount of the cleaning liquid.

According to a second aspect of the present disclosure, there is provided a set including:

- the cleaning liquid of the first aspect; and
- a water-based ink for ink-jet recording including water-insoluble particles and water.

According to a third aspect of the present disclosure, there is provided an ink-jet recording apparatus including:

- an ink storage configured to store an ink therein:
- an ink-jet head configured to discharge the ink stored in the ink storage:
- an ink channel provided between the ink storage and the ink-jet head; and
- a cleaning liquid-supplying mechanism configured to supply, to the ink-jet head and the ink channel, the cleaning liquid of the first aspect.

According to a fourth aspect of the present disclosure, there is provided a cleaning method of cleaning an ink-jet recording apparatus including: an ink storage, an ink-jet head, an ink channel provided between the ink storage and the ink-jet head, and a cleaning liquid-supplying mechanism,

- the cleaning method including supplying the cleaning liquid of the first aspect to the ink-jet head and the ink channel, by using the cleaning liquid-supplying mechanism.

BRIEF DESCRIPTION OF THE DRAWINGS

FIG. 1 is a schematic view depicting the configuration of an example of an ink-jet recording apparatus in which a cleaning liquid related to the present disclosure is usable.

DETAILED DESCRIPTION

In the present disclosure, a phrase such as a "surfactant having solubility in water at 20° C., that is 0.2% by mass" means a surfactant wherein a maximum soluble amount thereof in 99.8 g of water at 20° C. is 0.2 g.

In the present disclosure, the term "solubility parameter (SP value)" indicates, for example, a value obtained by the following expression by means of the Fedors method, and the unit thereof is $(cal/cm^3)^{1/2}$.

$$\text{SP value}=(\Sigma\Delta ei/\Sigma\Delta vi)^{1/2}$$

$\Delta ei$=evaporation energy of an atom and atomic group (cal/mol)

$\Delta vi$=molar volume ($cm^3$/mol)

A cleaning liquid related to the present disclosure is suitably usable to perform maintenance of an ink-jet recording apparatus using a water-based ink for ink-jet recording (hereinafter also referred to as a "water-based ink" or an "ink", in some cases) having a satisfactory wetting property with respect to a recording medium having hydrophobicity such as, for example, coated paper, plastic, film, an OHP sheet, etc., but is not limited to or restricted by this usage.

The cleaning liquid related to the present disclosure is usable to perform maintenance also, for example, of an ink-jet recording apparatus using a water-based ink for ink-jet recording suitable for a recoding medium which is different from the hydrophobic recording medium and which includes, for example, regular paper (plain paper), glossy paper, mat paper, etc. In the present disclosure, the term "coated paper" means, for example, paper obtained by coating, with a coating agent, regular paper made mainly from pulp, such as high-grade print paper and middle-grade print paper. The coating agent is applied to the regular paper to improve its smoothness, whiteness, brightness, etc. The coated paper is specifically exemplified by high-grade coated paper, middle-grade coated paper, etc.

The cleaning liquid related to the present disclosure will be explained. The cleaning liquid related to the present disclosure is a cleaning liquid usable for cleaning of an ink-jet recording apparatus and contains a nonionic surfactant, a first water-soluble organic solvent, a second water-soluble organic solvent and water.

The nonionic surfactant is such a hydrophobic surfactant wherein the solubility in the water at 20° C. is less than 0.2% by mass, and is hardly dissolved to water. It is allowable to use, as the hydrophobic nonionic surfactant, for example, a commercially available product. The commercially available product is exemplified, for example, by: "EMULGEN (trade name) 108" (polyoxyethylene lauryl ether) which is produced by KAO CORPORATION; "OLFINE (trade name) E1004" (acetylene glycol-based surfactant) which is produced by NISSHIN CHEMICAL CO., LTD.; "NONION (trade name) EH-204" (polyoxyethylene-2-ethylhexyl ether) produced by NOF CORPORATION; etc. In the nonionic surfactant, the solubility in water at 20° C. may be less than 0.1% by mass.

Only one kind of the hydrophobic nonionic surfactant as described above may be used singly, or two or more kinds of the hydrophobic nonionic surfactant as described above may be used in combination. A content amount (X) of the hydrophobic nonionic surfactant in the entire amount of the cleaning liquid will be described later on.

It is allowable that only the hydrophobic nonionic surfactant is contained in the cleaning liquid, as the surfactant thereof. Alternatively, the cleaning liquid may further contain, in addition to the hydrophobic nonionic surfactant, another surfactant which is different from the hydrophobic nonionic surfactant.

The first water-soluble organic solvent has the solubility parameter (SP value) (hereinafter referred to as the "SP value" in some cases) which is not less than 13. The first water-soluble organic solvent is exemplified, for example, by glycerol (SP value: 17.5), diethylene glycol (SP value: 14.6), propylene glycol (SP value: 13.5), etc.

Only one kind of the first water-soluble organic solvent as described above may be used singly, or two or more kinds of the first water-soluble organic solvent as described above may be used in combination. A content amount (A) of the first water-soluble organic solvent in the entire amount of the cleaning liquid will be described later on.

The second water-soluble organic solvent has the SP value which is less than 12. The second water-soluble organic solvent is exemplified, for example, by tripropylene glycol (SP value: 11.5), 1,2-hexanediol (SP value: 11.8), triethylene glycol-n-butyl ether (SP value: 9.8), tripropylene glycol-n-butyl ether (SP value: 9.2), etc.

Only one kind of the second water-soluble organic solvent as described above may be used singly, or two or more kinds of the second water-soluble organic solvent as described above may be used in combination. A content amount (B) of the second water-soluble organic solvent in the entire amount of the cleaning liquid will be described later on.

The water-soluble organic solvent contained in the cleaning liquid may be only the first water-soluble organic solvent and the second water-soluble organic solvent as described above. Alternatively, the cleaning liquid may further contain another water-soluble organic solvent, in addition to the first and second water-soluble organic solvents, which is different from the first and second water-soluble organic solvents. The mass ratio of the first water-soluble organic solvent and the second water-soluble organic solvent relative to the entire amount of the water-soluble organic solvent in the cleaning liquid is, for example, not less than 50% by mass or 100% by mass.

The water is preferably ion-exchanged water or pure water (purified water). The content amount of the water in the entire amount of the cleaning liquid is, for example, in a range of 10% by mass to 90% by mass, or in a range of 20% by mass to 80% by mass. The content amount of the water may be, for example, a balance of the other components.

Although it is preferred that the cleaning liquid does not contain any colorant, the cleaning liquid may contain a colorant. In a case that the cleaning liquid contains a colorant, it is preferred that a content amount of the colorant in the cleaning liquid is an amount to such an extent which does not affect a recorded image. The content amount of the colorant in the entire amount of the cleaning liquid is, for example, not more than 0.1% by mass, or 0% by mass.

The cleaning liquid ink may further include a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc. In view of further suppressing any closing of channel and clogging of nozzle(s), the cleaning liquid ink may not include water-insoluble particles which are similar to those included in a water-based ink described later. The water-insoluble particles may be exemplified, for example, by a pigment, a resin for dispersing pigment (resin dispersant), resin minutes particles (resin fine particles), etc.

The cleaning liquid can be prepared, for example, by uniformly mixing the nonionic surfactant, the first water-soluble organic solvent, the second water-soluble organic solvent and the water by a conventionally known method.

The cleaning liquid satisfies the following conditions (1) to (4). The cleaning liquid contains the nonionic surfactant, the first water-soluble organic solvent and the second water-soluble organic solvent such that the following conditions (1) to (4) are satisfied, thereby making it possible to suppress any closing of channel and clogging of nozzle during the maintenance of an ink-jet recording apparatus using a water-based ink having a satisfactory wetting property with respect to a hydrophobic recording medium.

$$X \geq 0.1 \quad \text{Condition (1):}$$

$$A-B \geq 0 \quad \text{Condition (2):}$$

$$B/X \geq 15 \quad \text{Condition (3):}$$

$$10 \leq A+B \leq 60 \quad \text{Condition (4):}$$

in the conditions (1) to (4),

X: a content amount (% by mass) of the nonionic surfactant in an entire amount of the cleaning liquid, A: a content amount (% by mass) of the first water-soluble organic solvent in the entire amount of the cleaning liquid, and B: a content amount (% by mass) of the second water-soluble organic solvent in the entire amount of the cleaning liquid.

The cleaning liquid may further satisfy any one of the following conditions (5) to (7). By satisfying the following conditions (5) to (7), the cleaning liquid is capable of further suppressing any closing of channel and clogging of nozzle during the maintenance of the ink-jet recording apparatus using a water-based ink having a satisfactory wetting property with respect to a hydrophobic recording medium.

$$0.1 \leq X \leq 1.5 \quad \text{Condition (5):}$$

$$0 \leq A-B \leq 15 \quad \text{Condition (6):}$$

$$15 \leq B/X \leq 50 \quad \text{Condition (7):}$$

in the conditions (5) to (7).

X: the content amount (% by mass) of the nonionic surfactant in the entire amount of the cleaning liquid, A: the content amount (% by mass) of the first water-soluble organic solvent in the entire amount of the cleaning liquid, and B: the content amount (% by mass) of the second water-soluble organic solvent in the entire amount of the cleaning liquid.

It is allowable to appropriately adjust each of the content amount (X) of the nonionic surfactant, the content amount (A) of the first water-soluble organic solvent and the content amount (B) of the second water-soluble organic solvent so as to satisfy the above-described conditions (1) to (4), for example, as follows.

The content amount (X) of the nonionic surfactant is, for example, in a range of 0.1% by mass to 1.5% by mass, in a range of 0.1% by mass to 1% by mass, or in a range of 0.1% by mass to 0.5% by mass.

The content amount (A) of the first water-soluble organic solvent is, for example, in a range of 5% by mass to 30% by mass, or in a range of 5% by mass to 20% by mass.

The content amount (B) of the second water-soluble organic solvent is, for example, in a range of 5% by mass to 30% by mass, in a range of 5% by mass to 20% by mass, or in a range of 5% by mass to 15% by mass.

The cleaning liquid may be usable together with a water-based ink including water-insoluble particles and water.

The water-insoluble particles may be exemplified, for example, by a pigment (pigment particles), a resin for dispersing pigment (resin dispersant), resin minute particles (resin fine particles), etc.

The pigment is not particularly limited, and may be exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, iron oxide-based inorganic pigments, carbon black-based inorganic pigments, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment, etc.; dye lake pigments such as basic dye type lake pigment, acid dye type lake pigment, etc.; nitro pigments; nitroso pigments; aniline black daylight fluorescent pigment; etc. Further, it is also allowable to use, as the pigment, any pigment different from those listed above and dispersible in water phase. Specific examples of these pigments include, for example, C. I. Pigment Blacks 1, 6, and 7; C. I. Pigment Yellows 1, 2, 3, 12, 13, 14, 15, 16, 17, 55, 74, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; solid solutions of the above-listed pigments; etc. The water-based ink may be an ink in which the pigment is dispersed in water with a dispersant. As the dispersant, it is allowable to use, for example, a general polymeric dispersant (resin for dispersing pigment or resin dispersant), etc., and may be prepared in-house. Alternatively, in the water-based ink, the pigment may be subjected to polymer capsulation.

The pigment may be a self-dispersible pigment. The self-dispersible pigment is dispersible in water without using any dispersant, for example, owing to the fact that at least one of a hydrophilic functional group and the salt thereof including, for example, carbonyl group, hydroxyl group, carboxylic acid group, sulfonic acid group (sulfonate group), phosphoric acid group (phosphate group), etc., is introduced into the surfaces of the particles of the pigment by the chemical bond directly or with any group intervening therebetween. It is possible to use self-dispersible pigments wherein the pigment is subjected to the surface treatment by any one of methods described, for example, in Japanese Patent Application Laid-open No. HEI8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to United States Patent Application Publication No. US 2006/0201380 A1, Published Japanese Translation of PCT International Publication for Patent Application No. 2009-515007 corresponding to United States Patent Application Publications No. US 2007/0100023 A1 and No. US 2007/0100024 A1, Published Japanese Translation of PCT International Publication for Patent Application No. 2011-515535 corresponding to United States Patent Application Publications No. US 2009/0229489 A1, etc. It is possible to use, as a material for the self-dispersible pigment, either one of the inorganic pigment and the organic pigment. Further, a pigment which is suitable for the above-described treatment includes, for example, carbon black such as "MA8" and "MA100" produced by MITSUBISHI CHEMICAL CORPORATION, etc. As the self-dispersible pigment, it is possible, for example, to use a commercially available product.

The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by CABOT SPECIALTY CHEMICALS: "BONJET (trade name) BLACK CW-2" and "BONJET (trade name) BLACK CW-3" produced by ORIENT CHEMICAL INDUSTRIES, LTD., "LIOJET (trade name) WD BLACK 002C" produced by TOYO INK MFG. CO., LTD.; etc.

The solid content amount of the pigment (pigment solid content amount) in the entire amount of the water-based ink is not particularly limited, and may be appropriately determined based on, for example, a desired optical density, chromaticness, etc. The pigment solid content amount is, for example, in a range of 0.1% by mass to 20% by mass, in a range of 1% by mass to 15% by mass, or in a range of 2% by mass to 10% by mass.

The pigment may function, for example, as a colorant.

The water-based ink may contain, as the colorant, a dye instead of, or in addition to, the pigment.

The dye is not specifically limited, and is exemplified, for example, by a direct dye, an acidic dye, a basic dye, a reactive dye, a food dye, etc. Specific examples of the dye include, for example, C. I. Direct Black, C. I. Direct Blue, C. I. Direct Red, C. I. Direct Yellow. C. I. Direct Orange, C. I. Direct Violet, C. I. Direct Brown, C. I. Direct Green; C. I. Acid Black, C. I. Acid Blue, C. I. Acid Red, C. I. Acid Yellow, C. I. Acid Orange, C. I. Acid Violet; C. I. Basic Black, C. I. Basic Blue, C. I. Basic Red. C. I. Basic Violet; C. I. Reactive Blue, C. I. Reactive Red, C. I. Reactive Yellow; C. I. Food Black, C. I. Food Red, C. I. Food Yellow; etc. C. I. Direct Black described above is exemplified, for example, by C. I. Direct Blacks 17, 19, 22, 31, 32, 51, 62, 71, 74, 108, 112, 113, 146, 154, 168, 195, etc. C. I. Direct Blue described above is exemplified, for example, by C. I. Direct Blues 1, 6, 15, 22, 25, 41, 71, 76, 77, 80, 86, 90, 98, 106, 108, 120, 158, 163, 168, 199, 226, etc. C. I. Direct Red described above is exemplified, for example, by C. I. Direct Reds 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, etc. C. I. Direct Yellow described above is exemplified, for example, by C. I. Direct Yellows 8, 11, 12, 24, 26, 27, 28, 33, 39, 44, 50, 58, 85, 86, 87, 88, 89, 98, 100, 110, 132, 142, 173, etc. C. I. Direct Orange described above is exemplified, for example, by C. I. Direct Oranges 34, 39, 44, 46, 60, etc. C. I. Direct Violet described above is exemplified, for example, by C. I. Direct Violets 47, 48, etc. C. I. Direct Brown described above is exemplified, for example, by C. I. Direct Brown 109, etc. C. I. Direct Green described above is exemplified, for example, by C. I. Direct Green 59, etc. C. I. Acid Black described above is exemplified, for example, by C. I. Acid Blacks 2, 7, 24, 26, 31, 48, 51, 52, 63, 110, 112, 115, 118, 156, etc. C. I. Acid Blue described above is exemplified, for example, by C. I. Acid Blues 1, 7, 9, 15, 22, 23, 25, 29, 40, 43, 59, 62, 74, 78, 80, 90, 93, 100, 102, 104, 117, 120, 127, 138, 158, 161, 167, 220, 234, etc. C. I. Acid Red described above is exemplified, for example, by C. I. Acid Reds 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, etc. C. I. Acid Yellow described above is exemplified, for example, by C. I. Acid Yellows 1, 3, 7, 11, 17, 23, 25, 29, 36, 38, 40, 42, 44, 61, 71, 76, 98, 99, etc. C. I. Acid Orange described above is exemplified, for example, by C. I. Acid Oranges 7, 19, etc. C. I. Acid Violet described above is exemplified, for example, by C. I. Acid Violet 49, etc. The C. I. Basic Black is exemplified, for example, by C. I. Basic Black 2, etc. The C. I. Basic Blue is exemplified, for example, by C. I. Basic Blues 1, 3, 5, 7, 9, 24, 25, 26, 28, 29, etc. The C. I. Basic Red is exemplified, for example, by C. I. Basic Reds 1, 2, 9, 12, 13, 14, 37, etc. The C. I. Basic Violet is exemplified, for example, by C. I. Basic Violets 7, 14, 27, etc. C. I. Reactive Blue described above is exemplified, for example, by C. I. Reactive Blues 4, 5, 7, 13, 14, 15, 18, 19, 21, 26, 27, 29, 32, 38, 40, 44, 100, etc. C. I. Reactive Red described above is exemplified, for example, by C. I. Reactive Reds 7, 12, 13, 15, 17, 20, 23, 24, 31, 42, 45, 46, 59, etc. C. I. Reactive Yellow described above is exemplified, for example, by C. I. Reactive Yellows 2, 3, 17, 25, 37, 42, etc. C. I. Food Black described above is exemplified, for example, by C. I. Food Blacks 1, 2, etc. C. I. Food Red described above is exemplified, for example, by C. I. Food Reds 87, 92, 94, etc. C. I. Food Yellow described above is exemplified, for example, by C. I. Food Yellow 3, etc.

It is allowable that one kind of the dye as described above is used singly, or two or more kinds of the dye are used in combination. The content amount of the dye in the entire amount of the water-based ink is, for example, in a range of 0.1% by mass to 20% by mass, in a range of 1% by mass to 15% by mass, or in a range of 2% by mass to 10% by mass.

The water-based ink may be a color ink (chromatic ink) including the colorant, or may be a colorless or achromatic ink (clear ink) not including any colorant.

The glass-transition temperature (Tg) of the resin minute particles is, for example, in a range of −60° C. to 150° C., in a range of 20° C. to 100° C., or is not more than 55° C. The resin minute particles may be, for example, resin minute particles contained in a resin emulsion. The term "resin emulsion" means a resin emulsion composed of, for example, the resin minute particle and a disperse medium (for example, water, etc.); in the resin emulsion, the resin minute particles are dispersed with a specific particle diameter (particle size) in the disperse medium, rather than in a dissolved state in the disperse medium. In the present specification, the resin particles included in the resin emulsion are defined as "emulsion particles". The resin minute particles may be exemplified, for example, by acrylic acid-based resin, maleate ester-based resin, vinyl acetate-based resin, carbonate-based resin, styrene-based resin, ethylene-based resin, propylene-based resin, urethane-based resin, and copolymer resin thereof. Only one kind of the resin minute particles as described above may be used singly, or two or more kinds of the resin minute particles as described above may be used in combination.

As the resin emulsion, it is allowable to use, for example, a commercially available product. The commercially available product is exemplified, for example, by "MOWINYL (trade name) 6969D" (acrylic resin emulsion) (Tg: 71° C.), "MOWINYL (trade name) 5450" (Tg: 53° C.) and "MOWINYL (trade name) DM772" (Tg: 22° C.) produced by JAPAN COATING RESIN CO., LTD.; "POLYSOL (trade name) AP-3770 (styrene-acrylic resin emulsion) produced by SHOWA DENKO K.K.; "SUPERFLEX (trade name) 150" (urethane resin emulsion) (Tg: 40° C.) produced by DKS CO., LTD. (DAI-ICHI KOGYO SEIYAKU CO., LTD.); etc.

The mean particle diameter of the resin minute particles is, for example, in a range of 5 nm to 500 nm, in a range of 20 nm to 300 nm or in a range of 30 nm to 200 nm. The mean particle diameter can be measured, for example, by using a dynamic light scattering particle diameter distribution measuring apparatus "LB-550" (product name) produced by HORIBA, LTD., as the arithmetic mean diameter. The mean particle diameter may be a mean particle diameter (intensity mean particle diameter) calculated based on an intensity-based particle size distribution (light scattering intensity-based particle size distribution).

The content amount of the resin minute particles in the entire amount of the water-based ink is, for example, in a range of 0.1% by mass to 30% by mass, in a range of 0.5% by mass to 20% by mass, or in a range of 1% by mass to 10% by mass. One kind of the resin minute particles described above may be used singly, or two or more kinds of the resin minute particles as described above may be used in combination.

The water in the above-described water-based ink is preferably ion-exchanged water or pure water (purified water). The content amount of the water in the entire amount of the water-based ink is, for example, in a range of 10% by mass to 90% by mass, or in a range of 20% by mass to 80% by mass. The content amount of the water may be, for example, a balance of the other components.

The water-based ink may further contain a surfactant and a water-soluble organic solvent which are similar to those in the cleaning liquid described above.

The water-based ink may further include a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The water-based ink can be prepared, for example, by uniformly mixing the water-insoluble particles, the water and an optionally other additive(s) as necessary, by a conventionally known method, and then removing any non-dissolved matter, with a filter, etc.

According to the present disclosure, a set of the above-described cleaning liquid and the above-described water-based ink can also be provided.

For example, the cleaning liquid is usable for cleaning the ink-jet head, the ink channel, and the wiper which makes contact with the nozzle-formation surface of the ink-jet head having nozzles formed therein so as to wipe the ink off from the nozzle-formation surface, etc., in the ink-jet recording apparatus.

Next, an ink-jet recording apparatus and a cleaning method of the ink-jet recording apparatus related to the present disclosure will be explained.

The ink-jet recording apparatus related to the present disclosure is an ink-jet recording apparatus characterized by including: an ink storing part (ink storage), an ink-jet head, and an ink channel provided between the ink storing part and the ink-jet head, and being configured to discharge an ink stored in the ink storing part by the ink-jet head; the ink-jet recording apparatus further including a cleaning liquid-supplying mechanism, wherein the cleaning liquid-supplying mechanism is capable of supplying, to the ink-jet head and the ink channel, the cleaning liquid related to the present disclosure. The ink-jet recording apparatus related to the present disclosure may further include a wiper configured to make contact with a nozzle-formation surface, of the ink-jet head, having nozzles formed therein, so as to wipe the ink off from the nozzle-formation surface, and the cleaning liquid-supplying mechanism may be capable of supplying the cleaning liquid related to the present disclosure to the wiper. Further, as will be described later on, the ink-jet recording apparatus related to the present disclosure may further include a drying mechanism configured to dry a recording part or recording portion recorded with the ink.

The cleaning method of cleaning an ink-jet recording apparatus related to the present disclosure is a cleaning method of cleaning an ink-jet recording apparatus including: an ink storing part (ink storage), an ink-jet head, and an ink channel provided between the ink storing part and the ink-jet head, the method being characterized by supplying the cleaning liquid related to the present disclosure by a cleaning liquid-supplying mechanism to thereby clean the ink-jet head and the ink channel. In the cleaning method related to the present disclosure, the ink-jet recording apparatus further includes a wiper configured to make contact with a nozzle-formation surface, of the ink-jet head, having nozzles formed therein, so as to wipe the ink off from the nozzle-formation surface; the cleaning method may clean the wiper by supplying the cleaning liquid, to the wiper, by the cleaning liquid-supplying mechanism.

FIG. 1 schematically depicts an exemplary configuration of the ink-jet recording apparatus related to the present disclosure. As depicted in FIG. 1, an ink-jet recording apparatus 100 includes a feed tray 101, a conveyance mechanism (not depicted) such as a roller, recording mechanisms 102A and 102B, a platen 103, a drying mechanism 104, a discharge tray 105, and an ink storing part (ink storage) 106 such as ink cartridges or ink tanks. The feed tray 101 can support a plurality of pieces of a recording medium P (e.g., a plurality of pieces of coated paper sheet) stacked thereon.

The recording mechanism includes a carriage 102A and an ink-jet head (ink discharging mechanism, ink-jetting mechanism) 102B. The carriage 102A is supported by two guide rails (not depicted) extending orthogonally with respect to a conveyance direction of the recording medium P. The two guide rails are supported by a casing (not depicted) of the ink-jet recording apparatus 100. The carriage 102A is connected to a well-known belt mechanism (not depicted) provided in the two guide rails. The belt mechanism is driven by a carriage motor (not depicted). The carriage motor is driven to thereby cause the carriage 102A connected to the belt mechanism to reciprocate (move reciprocatingly) in an orthogonal direction which is orthogonal with respect to the conveyance direction of the recording medium P.

Further, four ink tubes (ink channels) 107*a* to 107*d* connecting the ink storing part 106 and the ink-jet head 102B, and a flexible flat cable (not depicted) electrically connecting a control board (not depicted) and the ink-jet head 102B extend from the carriage 102A. Four colors of water-based inks (yellow, magenta, cyan, and black) stored in the ink storing part 106 are supplied to the ink-jet head 102B via the four ink tubes 107*a* to 107*d*. For example, at least one of the four water-based color inks is the water-based ink for ink-jet recording which constructs a set, together with the cleaning liquid related to the present disclosure. A control signal outputted from the control board is transmitted to the ink-jet head 102B via the flexible flat cable.

As depicted in FIG. 1, the carriage 102A has the ink-jet head 102B mounted or installed therein. A plurality of nozzles 102C are formed in a lower surface of the ink-jet head 102B. A front end of each of the plurality of nozzles 102C is exposed from the carriage 102A and the lower surface of the ink-jet head 102B. The ink-jet head 102B includes an actuator (not depicted) which applies force for jetting the water-based ink(s) which is (are) supplied from the ink storing part 106 to the ink-jet head 102B via the ink tube(s) 107*a* to 107*d*. The actuator may be an actuator of any system, such as a piezoelectric element system, a thermal ink-jet system, an electrostatic attraction system, etc. The ink-jet head 102B jets or discharges the water-based ink, as fine or minute ink droplets of the water-based ink, from the plurality of nozzles 102C during a process in which the carriage 102A reciprocates in the orthogonal direction orthogonal with respect to the conveyance direction of the recording medium P. With this, an image is recorded on the recording medium P. The ink-jet recording apparatus 100 may be provided with a wiper 108 configured to perform wiping of a surface, having the plurality of nozzles 102C formed therein, of the ink-jet head 102B which is returned to a reset position in a case that recording is finished. The platen 103 is arranged so as to face the recording mechanism, and supports the recording medium P conveyed from the feed tray 101.

The drying mechanism 104 heats and dries a recording part of the recording medium P. The drying temperature during the drying can be adjusted as appropriate by changing the setting of the drying mechanism 104. Specifically, the drying temperature may be, for example, in a range of 20° C. to 200° C. or in a range of 50° C. to 100° C. The drying time may be also adjusted as appropriate by changing the setting of the drying mechanism 104. For example, the drying time may be in a range of a second(s) exceeding 0 (zero) seconds to not more than 300 seconds, in a range of 0.1 seconds to 60 seconds, or in a range of 30 second to 60 seconds. Any drying mechanism which is capable of drying the recording part may be used as the drying mechanism 104.

Examples of the drying mechanism 104 include commercially available dryers, IR heaters, ovens, belt conveyer ovens, irons, hot presses, etc. A non-contact drying mechanism, such as the drier, IR heater, the oven, the belt conveyer oven, etc., which dries the recording part of the recording medium P without contacting with the recording part is preferably used.

The recording medium P after recording and drying is conveyed to the discharge tray 105.

The cleaning liquid-supplying mechanism supplies the cleaning liquid to the ink-jet head 102B, the ink tube(s) 107*a* to 107*d*, the wiper 108, etc., and performs the cleaning of the ink-jet head 102B, the ink tube(s) 107*a* to 107*d*, the wiper 108, etc., with the cleaning liquid. The cleaning liquid-supplying mechanism may be any mechanism provided that the mechanism is capable of supplying the cleaning liquid to the ink-jet head 102B, the ink tube(s) 107*a* to 107*d*, the wiper 108, etc. For example, it is allowable to use, as the cleaning liquid-supplying mechanism, a cleaning liquid-storing part 109 configure to store the cleaning liquid therein. It is allowable that the ink tubes (ink channels) 107*a* to 107*d* are connected to the cleaning liquid-storing part 109, instead of being connected to the ink storing part 106 as depicted in FIG. 1, and to supply the cleaning liquid, rather than the ink, to the ink-jet head 102B, the ink tubes 107*a* to 107*d* and the wiper 108 to thereby clean the ink-jet head 102B, the ink tubes 107*a* to 107*d* and the wiper 108.

EXAMPLES

Next, Examples of the present disclosure will be explained together with Comparative Examples. Note that the present disclosure is not limited to and restricted by Examples and Comparative Examples described below.

<Preparation of Resin Dispersant>

135 g of Terathane (trade name) 650 (polyether diol produced by INVISTA (Wichita, KS), 54 g of 2,2'-dimethylolpropionic acid (DMPA), 132 g of sulfolane and 0.06 g of dibutyltin dilaurate (DBTDL) were added to a flask provided with a dropping funnel, a condenser and an agitator (stirring device) under an atmosphere of nitrogen, then were heated up to 60° C. while being mixed, and then were mixed sufficiently; thus, a mixture was obtained. To the obtained mixture, 164 g of m-tetramethylene xylylenediisocyanate (TMXDI) was added with the dropping funnel, and remaining TMXDI in the dropping funnel was rinsed with 15 g of sulfolane into the flask. The temperature was raised up to 100° C., and was maintained at 100° C. until the content rate of isocyanate reached to be not more than 1.3% by mass. Next, the temperature was lowered up to 60° C., then 12.9 g of diethanolamine (DEA) was added to the mixture over 5 (five) minutes with the dropping funnel, and the temperature was maintained at 60° C. until remaining DEA in the dropping funnel was rinsed with 5 g of sulfolane into the flask. Furthermore, the temperature was maintained at 60° C. for one hour, then 376 g of a 3% by mass aqueous solution of potassium hydroxide was added to the mixture over 10 (ten) minutes with the dropping funnel, then 570 g of deionized water was further added to the mixture. Then, the temperature was maintained at 60° C. for one hour, and cooling to the room temperature was performed. Thus, a resin dispersant with 24% by mass of solid content was obtained.

<Preparation of Pigment Dispersion Liquid A>

The resin dispersant was neutralized with either one of potassium hydroxide and amine in order to increase the solubility in water and to make the resin dispersant to easily dissolve to water. Then, a microfluidizer of high-pressure compressed air system (Model name: M-110Y, produced by MICROFLUIDICS (Newton, Massachusetts)) was used so as to produce a mixture in which content amount of carbon black was approximately 27% by mass and the mass ratio (P/D) of the content amount (P) of the carbon black to the content amount (D) of the resin dispersant was P/D=3. Then, deionized water was added to the mixture so that the content amount of the carbon black was made to be approximately 24% by mass for the suitable medium mill grinding condition; and the mixture was milled (pulverized) for 4 (four) hours. After the milling, the deionized water was added, and the mixture was mixed sufficiently. Then, after any impurity was filtered and removed, dilution with deionized water was performed; thus, a pigment dispersion liquid A was obtained.

<Preparation of Pigment Dispersion Liquid B>

A pigment dispersion Liquid B was obtained similarly to the above-described preparation of the pigment dispersion liquid A, except that an Eiger Minimill (Model name: M250, produced by VSE EXP. EIGER MACHINERY INC. (Chicago, Illinois)) was used, instead of using the microfluidizer of high-pressure compressed air system, and that a phthalocyanine pigment was used instead of using the carbon black.

<Preparation of Water-Based Inks 1 to 3>

Ingredients or components, except for CAB-O-JET (trade name) 300 and the pigment dispersion liquid A or B, which were included in Water-based ink composition (TABLE 1) were mixed uniformly or homogeneously; and thus an ink solvent was obtained. Subsequently, the ink solvent was added to CAB-O-JET (trade name) 300 and the pigment dispersion liquid A or B, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus water-based inks 1 to 3 for ink-jet recording as indicated in TABLE 1 was obtained.

<Preparation of Water-Based Ink 4>

Ingredients or components in Water-based ink composition (TABLE 1) were mixed uniformly or homogeneously; and thus a mixture was obtained. After that, the obtained mixture was filtrated through a polytetrafluoroethylene (PTFE) membrane filter (pore size 0.20 μm) produced by TOYO ROSHI KAISHA, LTD., and thus the water-based ink 4 for ink-jet recording as indicated in TABLE 1 was obtained. The water-based ink 4 is a colorless or achromatic ink (clear ink) not including any colorant.

Table 1 (Following)—Legend

*1: Self-dispersible pigment; produced by CABOT SPECIALTY CHEMICALS, INC.; numerals in TABLE 1 indicate pigment solid content amount.

*2: Water dispersion of carbon black (containing 1.5% by mass of resin dispersant); numerals in TABLE 1 indicate pigment solid content amount.

*3: Water dispersion of phthalocyanine pigment (containing 1% by mass of resin dispersant); numerals in TABLE 1 indicate pigment solid content amount.

*4: Resin emulsion; produced by DAI-ICHI KOGYO SEIYAKU CO., LTD.; numerals in TABLE 1 indicate the active ingredient amount (solid content amount).

*5: Resin emulsion; produced JAPAN COATING RESIN CO., LTD.; numerals in TABLE 1 indicate the active ingredient amount (solid content amount).

*6: Nonionic surfactant, the solubility thereof in water at 20° C. being less than 0.2% by mass; produced by NISSIN CHEMICAL INDUSTRY CO., LTD., numerals in TABLE 1 indicate the active ingredient amount.

<Evaluation of Cleaning of Wiper: Evaluation Criterion>

AA: Any conspicuous remaining of liquid was not present in the water-repelling treated surface.

A: A very slight amount of liquid remained on the water-repelling treated surface.

B: A much amount of liquid remained on the water-repelling treated surface.

(b) Evaluation of Aggregation by Contact with Water-Based Ink

The cleaning liquid of each of Examples 1 to 8 and Comparative Examples 1 to 5 which was subjected to evaporation so that approximately 30% of the cleaning liquid was evaporated was brought into contact with any one of the water-based inks 1 to 4. The contact interface between the cleaning liquid and the water-based ink was visually observed, and evaluation was made based on the following evaluation criterion.

<Evaluation of Aggregation by Contact with Water-Based Ink: Evaluation Criterion>

AA: Any agglomerate was not present in the contact interface.

A: A very slight amount of agglomerate was present in the contact interface.

B: A large agglomerate was present in the contact interface.

The cleaning liquid compositions and the evaluation results of the above-described evaluation in Examples 1 to 8 and Comparative Examples 1 to 5 are indicated in TABLE 2 as follows.

Table 2 (Following)—Legend

*7: Surfactant, the solubility thereof in water at 20° C. being less than 0.2% by mass; produced by KAO CORPORATION; numerals in TABLE 2 indicate the active ingredient amount.

TABLE 1

| | | Water-based ink | | | |
|---|---|---|---|---|---|
| | | 1 | 2 | 3 | 4 |
| Water-based ink composition (% by mass) | CAB-O-JET (trade name) 300 (*1) | 3.75 | — | — | — |
| | Pigment dispersion liquid A (*2) | — | 4.5 | — | — |
| | Pigment dispersion liquid B (*3) | — | — | — | — |
| | Propylene glycol | 30 | 30 | 30 | 30 |
| | Tripropylene glycol | 3 | 3 | 3 | 3 |
| | SUPERFLEX (trade name) 150 (*4) | 16.7 | — | — | — |
| | MOWINYL (trade name) 6969D (* 5) | — | 12 | 12 | 12 |
| | OLFINE (trade name) E1004 (*6) | 2 | 2 | 2 | 2 |
| | Water | balance | balance | balance | balance |

Examples 1 to 8 and Comparative Examples 1 to 5

Components which were included in Cleaning Liquid Composition (TABLE 2) as indicated below were mixed uniformly or homogeneously, and thus a cleaning liquid in each of Examples 1 to 8 and Comparative Examples 1 to 5 as indicated in TABLE 2 were obtained.

With respect to the cleaning liquids of Examples 1 to 8 and Comparative examples 1 to 5, (a) evaluation of cleaning of wiper and (b) evaluation of aggregation by contact with water-based ink were conducted by the following methods.

(a) Evaluation of Cleaning of Wiper

A water-repelling treated surface of a wiper wetted by the cleaning liquid of each of Examples 1 to 8 and Comparative Examples 1 to 5 was visually observed for the presence of any remaining of liquid in the water-repelling treated surface, and evaluation was made based on the following evaluation criterion.

*6: Nonionic surfactant, the solubility thereof in water at 20° C. being less than 0.2% by mass; produced by NISSIN CHEMICAL INDUSTRY CO., LTD., numerals in TABLE 2 indicate the active ingredient amount.

*8: Nonionic surfactant, the solubility thereof in water at 20° C. being less than 0.2% by mass; produced by NOF CORPORATION, numerals in TABLE 2 indicate the active ingredient amount.

*9: Surfactant, the solubility thereof in water at 20° C. exceeding 0.2% by mass; produced by KAO CORPORATION, numerals in TABLE 2 indicate the active ingredient amount.

*10: Surfactant, the solubility thereof in water at 20° C. exceeding 0.2% by mass; produced by NISSIN CHEMICAL INDUSTRY CO., LTD., numerals in TABLE 2 indicate the active ingredient amount.

TABLE 2

| | | | Examples | | | | | | | |
|---|---|---|---|---|---|---|---|---|---|---|
| | | | 1 | 2 | 3 | 4 | 5 | 6 | 7 | 8 |
| Cleaning liquid composition (% by mass) | Nonionic surfactant (X) | EMULGEN (trade name) 108 (*7) | 1 | — | — | — | — | 0.5 | 1 | — |
| | | OLFINE (trade name) E1004 (*6) | — | 0.5 | — | 0.1 | 1 | — | — | 1.5 |
| | | NONION (trade name) EH-204 (*8) | — | — | 0.5 | — | — | — | — | — |
| | Nonionic surfactant | EMULGEN (trade name) 109P (*9) | 1 | — | — | — | — | — | 1 | — |
| | | OLFINE (trade name) E1010 (*10) | — | 1 | — | 1 | 1 | — | — | 1 |
| | First water-soluble organic solvent (A) | Glycerol | 20 | 15 | 20 | — | 30 | — | — | 20 |
| | | Diethylene glycol | — | 5 | — | — | — | — | 20 | — |
| | | Propylene glycol | — | — | — | 5 | — | 30 | — | 10 |
| | Second water-soluble organic solvent (B) | Tripropylene glycol | 15 | — | 20 | 5 | 20 | — | 10 | 15 |
| | | 1,2-hexanediol | — | 10 | — | — | 10 | — | — | 10 |
| | | Triethylene glycol-n-butyl ether | 5 | — | — | — | — | 15 | 5 | — |
| | | Tripropylene glycol-n-butyl ether | — | 1 | — | — | — | — | — | 2 |
| | | Water | balance | balance | balance | balance | balance | balance | balance | balance |
| | | X | 1 | 0.5 | 0.5 | 0.1 | 1 | 0.5 | 1 | 1.5 |
| | | A − B | 0 | 9 | 0 | 0 | 0 | 15 | 5 | 3 |
| | | B/X | 20 | 22 | 40 | 50 | 30 | 30 | 15 | 18 |
| | | A + B | 40 | 31 | 40 | 10 | 60 | 45 | 35 | 57 |
| | | (a) Cleaning of Wiper | AA | AA | AA | A | A | A | A | A |
| | | (b) Aggregation by contact with water-based ink | | | | | | | | |
| | | Water-based ink 1 | A | A | AA | A | A | A | A | A |
| | | Water-based ink 2 | AA | A | AA | A | A | AA | A | A |
| | | Water-based ink 3 | AA | A | A | AA | A | AA | A | A |
| | | Water-based ink 4 | AA | AA | AA | A | A | A | A | A |

| | | | Comparative Examples | | | | |
|---|---|---|---|---|---|---|---|
| | | | 1 | 2 | 3 | 4 | 5 |
| Cleaning liquid composition (% by mass) | Nonionic surfactant (X) | EMULGEN (trade name) 108 (*7) | 1 | — | — | 1.5 | — |
| | | OLFINE (trade name) E1004 (*6) | — | 1.5 | 1 | — | 2 |
| | | NONION (trade name) EH-204 (*8) | — | — | — | — | — |
| | Nonionic surfactant | EMULGEN (trade name) 109P (*9) | 1 | 1 | — | — | — |
| | | OLFINE (trade name) E1010 (*10) | — | — | 2 | 1 | 2 |
| | First water-soluble organic solvent (A) | Glycerol | 30 | — | — | 40 | 25 |
| | | Diethylene glycol | — | — | — | 20 | — |
| | | Propylene glycol | — | — | 40 | — | — |
| | Second water-soluble organic solvent (B) | Tripropylene glycol | — | 10 | 10 | — | — |
| | | 1,2-hexanediol | — | 10 | — | 10 | 25 |
| | | Triethylene glycol-n-butyl ether | — | — | — | 5 | — |
| | | Tripropylene glycol-n-butyl ether | — | — | — | — | — |
| | | Water | balance | balance | balance | balance | balance |
| | | X | 1 | 1.5 | 1 | 1.5 | 2 |
| | | A − B | 30 | −20 | 30 | 45 | 0 |
| | | B/X | 0 | 13.3 | 10 | 10 | 12.5 |
| | | A + B | 30 | 20 | 50 | 75 | 50 |
| | | (a) Cleaning of Wiper | B | A | A | B | B |
| | | (b) Aggregation by contact with water-based ink | | | | | |
| | | Water-based ink 1 | B | B | B | B | B |
| | | Water-based ink 2 | B | B | B | B | B |
| | | Water-based ink 3 | B | B | A | B | B |
| | | Water-based ink 4 | A | A | B | B | B |

As indicated in TABLE 2, in Examples 1 to 8, the evaluation results were satisfactory in relation to (a) the cleaning of wiper and (b) the aggregation by contact with water-based ink.

On the other hand, Comparative Examples 1 and 5 in each of which B/X<15 and which did not satisfy the above-described condition (3) had unsatisfactory result in relation to (a) the cleaning of wiper, and also had unsatisfactory result in (b) the aggregation by contact with a part or all of the water-based inks 1 to 4. Further, Comparative Example 2 in which A−B<0 and B/X<15, and which did not satisfy the above-described conditions (2) and (3) had unsatisfactory result in (b) the aggregation by contact with a part of the water-based inks 1 to 4. Furthermore, Comparative Example 3 in which B/X<15 and which did not satisfy the above-described condition (3) had unsatisfactory result in (b) the aggregation by contact with a part of the water-based inks 1 to 4. Moreover, Comparative Example 4 in which B/X<15 and A+B>60, and which did not satisfy the above-described conditions (3) and (4) had unsatisfactory result in relation to (a) the cleaning of wiper, and also had unsatisfactory result in (b) the aggregation by contact with all of the water-based inks 1 to 4.

Parts or all of the embodiment and Examples described above can be also described as in the following addenda. However, the present disclosure is not limited to the following addenda.

(Addendum 1) A cleaning liquid usable for cleaning of an ink-jet recording apparatus, the cleaning liquid including:

a nonionic surfactant, solubility of the nonionic surfactant in water at 20° C. being less than 0.2% by mass;

a first water-soluble organic solvent of which solubility parameter is not less than 13:

a second water-soluble organic solvent of which solubility parameter is less than 12; and water, wherein the cleaning liquid satisfies the following conditions (1) to (4):

$$X \geq 0.1 \qquad \text{Condition (1):}$$

$$A-B \geq 0 \qquad \text{Condition (2):}$$

$$B/X \geq 15 \qquad \text{Condition (3):}$$

$$10 \leq A+B \leq 60 \qquad \text{Condition (4):}$$

in the conditions (1) to (4),

X: a content amount (% by mass) of the nonionic surfactant in an entire amount of the cleaning liquid, A: a content amount (% by mass) of the first water-soluble organic solvent in the entire amount of the cleaning liquid, and B: a content amount (% by mass) of the second water-soluble organic solvent in the entire amount of the cleaning liquid.

(Addendum 2) The cleaning liquid according to Addendum 1, wherein the first water-soluble organic solvent includes at least one selected from the group consisting of: glycerol, diethylene glycol and propylene glycol.

(Addendum 3) The cleaning liquid according to Addendum 1 or 2, wherein the second water-soluble organic solvent includes at least one selected from the group consisting of: tripropylene glycol, 1,2-hexanediol, triethylene glycol-n-butyl ether and tripropylene glycol-n-butyl ether.

(Addendum 4) The cleaning liquid according to any one of Addenda 1 to 3, usable together with a water-based ink for ink-jet recording including water-insoluble particles and water.

(Addendum 5) The cleaning liquid according to any one of Addenda 1 to 4, usable for cleaning at least one selected from the group consisting of: an ink-jet head, an ink channel and a wiper configured to make contact with a nozzle-formation surface of the ink-jet head and to wipe off an ink from the nozzle-formation surface, in the ink-jet recording apparatus.

(Addendum 6) A set including:

the cleaning liquid as defined in any one of Addenda 1 to 5; and a water-based ink for ink-jet recording including water-insoluble particles and water.

(Addendum 7) An ink-jet recording apparatus including:

an ink storing part (ink storage) configured to store an ink therein:

an ink-jet head configured to discharge the ink stored in the ink storing part;

an ink channel provided between the ink storing part and the ink-jet head; and a cleaning liquid-supplying mechanism configured to supply, to the ink-jet head and the ink channel, the cleaning liquid as defined in any one of Addenda 1 to 5.

(Addendum 8) The ink-jet recording apparatus according to Addendum 7, further including a wiper configured to make contact with a nozzle-formation surface of the ink-jet head and to wipe off the ink from the nozzle-formation surface, wherein the cleaning liquid-supplying mechanism is configured to supply the cleaning liquid to the wiper.

(Addendum 9) The ink-jet recording apparatus according to Addendum 7 or 8, further including a drying mechanism configured to dry a recording part recorded with the ink.

(Addendum 10) A cleaning method of cleaning an ink-jet recording apparatus including: an ink storing part (ink storage), an ink-jet head, an ink channel provided between the ink storing part and the ink-jet head, and a cleaning liquid-supplying mechanism, the method including: supplying the cleaning liquid as defined in any one of Addenda 1 to 5 to the ink-jet head and the ink channel, by using the cleaning liquid-supplying mechanism.

(Addendum 11) The cleaning method according to Addendum 10, wherein the ink-jet recording apparatus further includes a wiper configured to make contact with a nozzle-formation surface, of the ink-jet head, and to wipe off an ink from the nozzle-formation surface; and the cleaning method further includes supplying the cleaning liquid, to the wiper, by using the cleaning liquid-supplying mechanism.

As described above, the cleaning liquid related to the present disclosure is capable of suppressing any closing of channel and clogging of nozzle during the maintenance of an ink-jet recording apparatus using a water-based ink having a satisfactory wetting property with respect to a hydrophobic recording medium. The usage of the cleaning liquid related to the present disclosure is not particularly limited to the maintenance of the ink-jet recording apparatus using the water-based ink having the satisfactory wetting property with respect to a hydrophobic recording medium such as the coated paper, etc., and is widely applicable to the maintenance of an ink-jet recording apparatus using a water-based ink suitable for ink-jet recording on a variety of kinds of recording medium including, for example, plain paper (regular paper), glossy paper, mat paper, etc.

What is claimed is:

1. A cleaning liquid usable for cleaning of an ink-jet recording apparatus, the cleaning liquid comprising:

a nonionic surfactant, solubility of the nonionic surfactant in water at 20° C. being less than 0.2% by mass;

a first water-soluble organic solvent of which solubility parameter is not less than 13;

a second water-soluble organic solvent of which solubility parameter is less than 12; and water, wherein the cleaning liquid satisfies the following conditions (1) to (4):

$$X \geq 0.1 \quad \text{Condition (1):}$$

$$A-B \geq 0 \quad \text{Condition (2):}$$

$$B/X \geq 15 \quad \text{Condition (3):}$$

$$10 \leq A+B \leq 60 \quad \text{Condition (4):}$$

in the conditions (1) to (4),

X: a content amount (% by mass) of the nonionic surfactant in an entire amount of the cleaning liquid, A: a content amount (% by mass) of the first water-soluble organic solvent in the entire amount of the cleaning liquid, and B: a content amount (% by mass) of the second water-soluble organic solvent in the entire amount of the cleaning liquid, wherein the first water-soluble organic solvent includes at least one selected from the group consisting of: glycerol, diethylene glycol and propylene glycol, and wherein the second water-soluble organic solvent includes at least one selected from the group consisting of: tripropylene glycol, 1,2-hexanediol, triethylene glycol-n-butyl ether and tripropylene glycol-n-butyl ether.

2. The cleaning liquid according to claim 1, usable together with a water-based ink for ink-jet recording including water-insoluble particles and water.

3. The cleaning liquid according to claim 1, usable for cleaning at least one selected from the group consisting of: an ink-jet head, an ink channel and a wiper configured to make contact with a nozzle-formation surface of the ink-jet head and to wipe off an ink from the nozzle-formation surface, in the ink-jet recording apparatus.

4. A set comprising:

the cleaning liquid as defined in claim 1; and a water-based ink for ink-jet recording including water-insoluble particles and water.

5. The set according to claim 4, wherein the water-insoluble particles are pigment particles and/or resin minute particles.

6. An ink-jet recording apparatus comprising:

an ink storage configured to store an ink therein;

an ink-jet head configured to discharge the ink stored in the ink storage;

an ink channel provided between the ink storage and the ink-jet head; and a cleaning liquid-supplying mechanism configured to supply, to the ink-jet head and the ink channel, the cleaning liquid as defined in claim 1.

7. The ink-jet recording apparatus according to claim 6, further comprising a wiper configured to make contact with a nozzle-formation surface of the ink-jet head and to wipe off the ink from the nozzle-formation surface, wherein the cleaning liquid-supplying mechanism is configured to supply the cleaning liquid to the wiper.

8. The ink-jet recording apparatus according to claim 6, further comprising a drying mechanism configured to dry a recording part recorded with the ink.

9. A cleaning method of cleaning an ink-jet recording apparatus including: an ink storage, an ink-jet head, an ink channel provided between the ink storage and the ink-jet head, and a cleaning liquid-supplying mechanism, the cleaning method comprising supplying the cleaning liquid as defined in claim 1 to the ink-jet head and the ink channel, by using the cleaning liquid-supplying mechanism.

10. The cleaning method according to claim 9, wherein the ink-jet recording apparatus further includes a wiper configured to make contact with a nozzle-formation surface of the ink-jet head and to wipe off an ink from the nozzle-formation surface; and the cleaning method further comprises supplying the cleaning liquid to the wiper by using the cleaning liquid-supplying mechanism.

* * * * *